US009053069B2

(12) United States Patent
Brokenshire et al.

(10) Patent No.: US 9,053,069 B2
(45) Date of Patent: *Jun. 9, 2015

(54) EFFICIENT COMMUNICATION OF PRODUCER/CONSUMER BUFFER STATUS

(75) Inventors: Daniel A. Brokenshire, Round Rock, TX (US); Charles R. Johns, Austin, TX (US); Mark R. Nutter, Austin, TX (US); Barry L. Minor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 208 days.

This patent is subject to a terminal disclaimer.

(21) Appl. No.: 13/593,030

(22) Filed: Aug. 23, 2012

(65) Prior Publication Data

US 2012/0317372 A1 Dec. 13, 2012

Related U.S. Application Data

(63) Continuation of application No. 12/127,464, filed on May 27, 2008, now Pat. No. 8,275,917.

(51) Int. Cl.
*G06F 15/173* (2006.01)
(52) U.S. Cl.
CPC .............................. *G06F 15/17337* (2013.01)
(58) Field of Classification Search
USPC .......................................................... 710/52
See application file for complete search history.

(56) References Cited

U.S. PATENT DOCUMENTS

| | | | |
|---|---|---|---|
| 6,625,689 B2 | 9/2003 | Narad et al. | |
| 2002/0138701 A1* | 9/2002 | Suzuoki et al. | 711/154 |
| 2004/0264445 A1 | 12/2004 | Day et al. | |
| 2005/0120185 A1* | 6/2005 | Yamazaki et al. | 711/147 |
| 2005/0188373 A1 | 8/2005 | Inoue et al. | |
| 2006/0236136 A1 | 10/2006 | Jones | |
| 2007/0083870 A1* | 4/2007 | Kanakogi | 718/105 |

OTHER PUBLICATIONS

U.S. Appl. No. 11/140,453.
U.S. Appl. No. 12/127,464.
International Search Report and Written Opinion, International Serial No. PCT/EP2007/050182 dated May 2, 2008, 9 pages.
"Cell (microprocessor)", Wikipedia, the free encyclopedia, http://en.wikipedia.org/wiki/Cell_chip, printed Jul. 21, 2005, 7 pages.

(Continued)

*Primary Examiner* — Nicholas Jensen
(74) *Attorney, Agent, or Firm* — Francis Lammes; Stephen J. Walder, Jr.; Thomas E. Tyson

(57) ABSTRACT

A mechanism is provided for efficient communication of producer/consumer buffer status. With the mechanism, devices in a data processing system notify each other of updates to head and tail pointers of a shared buffer region when the devices perform operations on the shared buffer region using signal notification channels of the devices. Thus, when a producer device that produces data to the shared buffer region writes data to the shared buffer region, an update to the head pointer is written to a signal notification channel of a consumer device. When a consumer device reads data from the shared buffer region, the consumer device writes a tail pointer update to a signal notification channel of the producer device. In addition, channels may operate in a blocking mode so that the corresponding device is kept in a low power state until an update is received over the channel.

18 Claims, 8 Drawing Sheets

(56) References Cited

OTHER PUBLICATIONS

"Cell Broadband Engine Architecture, Version 1.0", IBM Corporation, Aug. 8, 2005, www-128.ibm.com/developerworks/power/cell, Aug. 8, 2005, pp. 1-319.

"The Cell architecture", IBM Corporation, http://domino.research.ibm.com/comm/research.nsf/pages/r.arch.innovation.html, printed Jul. 21, 2005, 5 pages.

Boianov, Luben K. et al., "Higher Speed Transputer Communication Using Shared Memory", Boianov et al., "Higher speed transputer communication using shared memory", Microprocessors and Microsystems, London, vol. 15, No. 2, Mar. 1991, pp. 67-72.

Capek, P et al., "Lock-Free Queue Management Scheme for Communication Between Two Processors", IBM Technical Disclosure Bulletin, Dec. 1, 1980, pp. 3059-3061.

Cvijovic, Miomirka et al., "An Approach to the Design of Distributed Real-Time Operating Systems", Cvijovic et al., "An approach to the design of distributed real-time operating systems", Microprocessors and Microsystems, London, vol. 16, No. 2, Jan. 1992, pp. 81-89.

Flachs, B et al., "A Streaming Processing Unit for a Cell Processor", IEEE International Solid-State Circuits Conference, 2005, pp. 134-135.

Flachs, Brian et al., "The Microarchitecture of the Synergistic Processor for a Cell Processor", Flachs et al., "The Microarchitecture of the Synergistic Processor for a Cell Processor", IEEE Journal of Solid-State Circuits, vol. 41, No. 1, Jan. 2006, pp. 63-70.

Pham, D et al., "The Design and Implementation of a First-Generation Cell Processor", IEEE International Solid-State Circuits Conference, Feb. 8, 2005, pp. 184-185 and 592.

Tannenbaum, A S., "Modern Operating Systems", A. S. Tannenbaum, "Modern Operating Systems", Prentice Hall, 1992, pp. 33-61.

\* cited by examiner

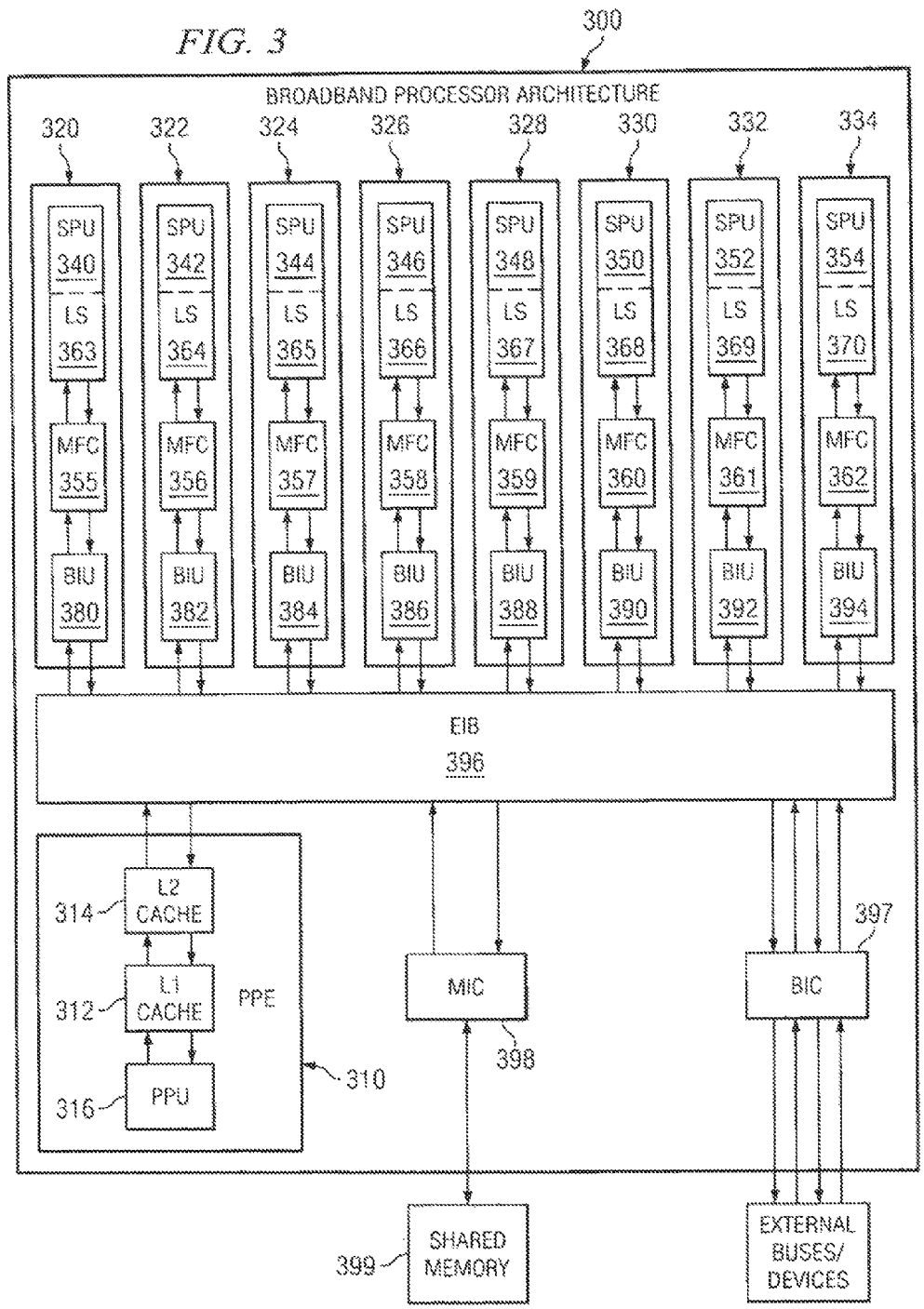

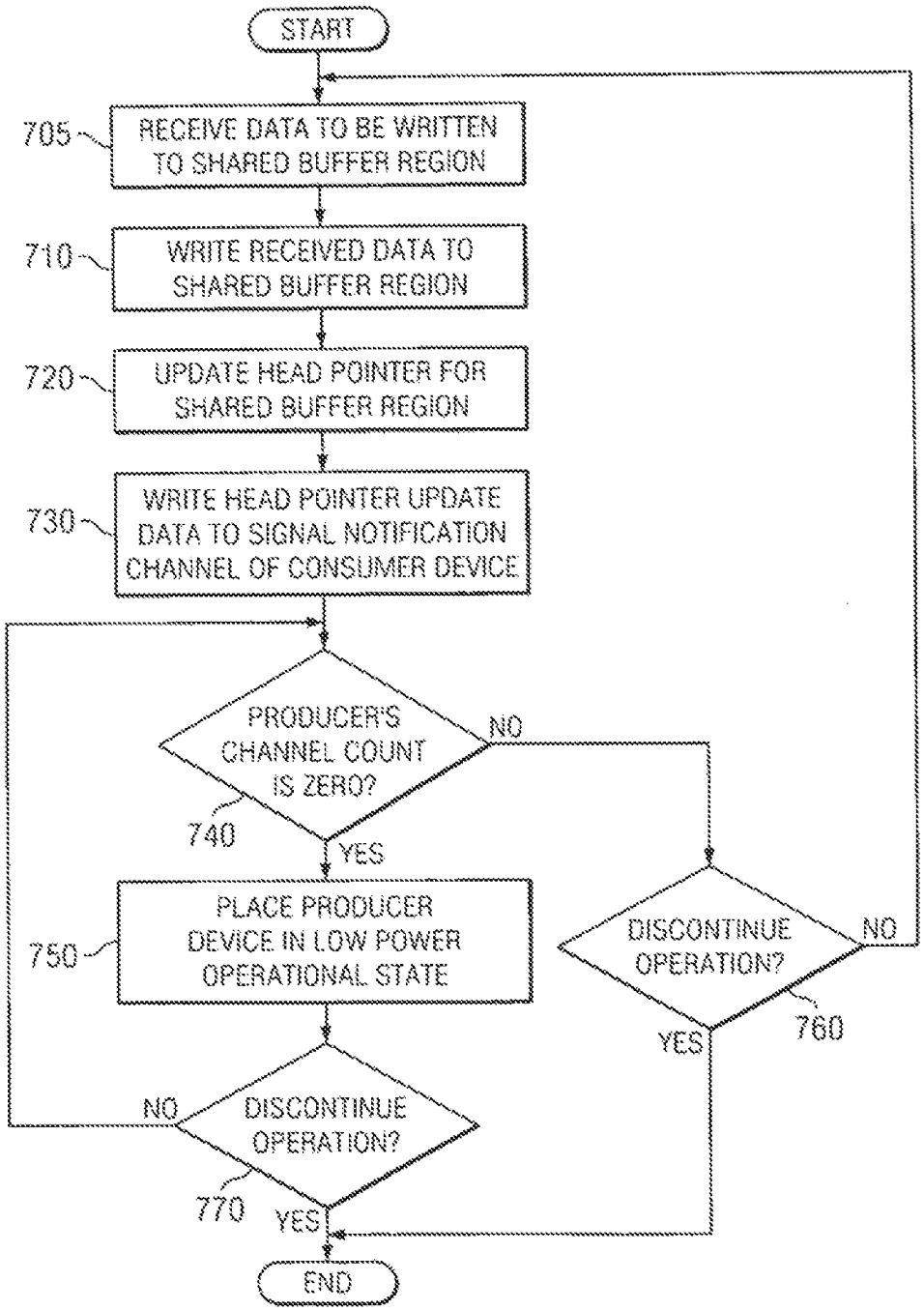

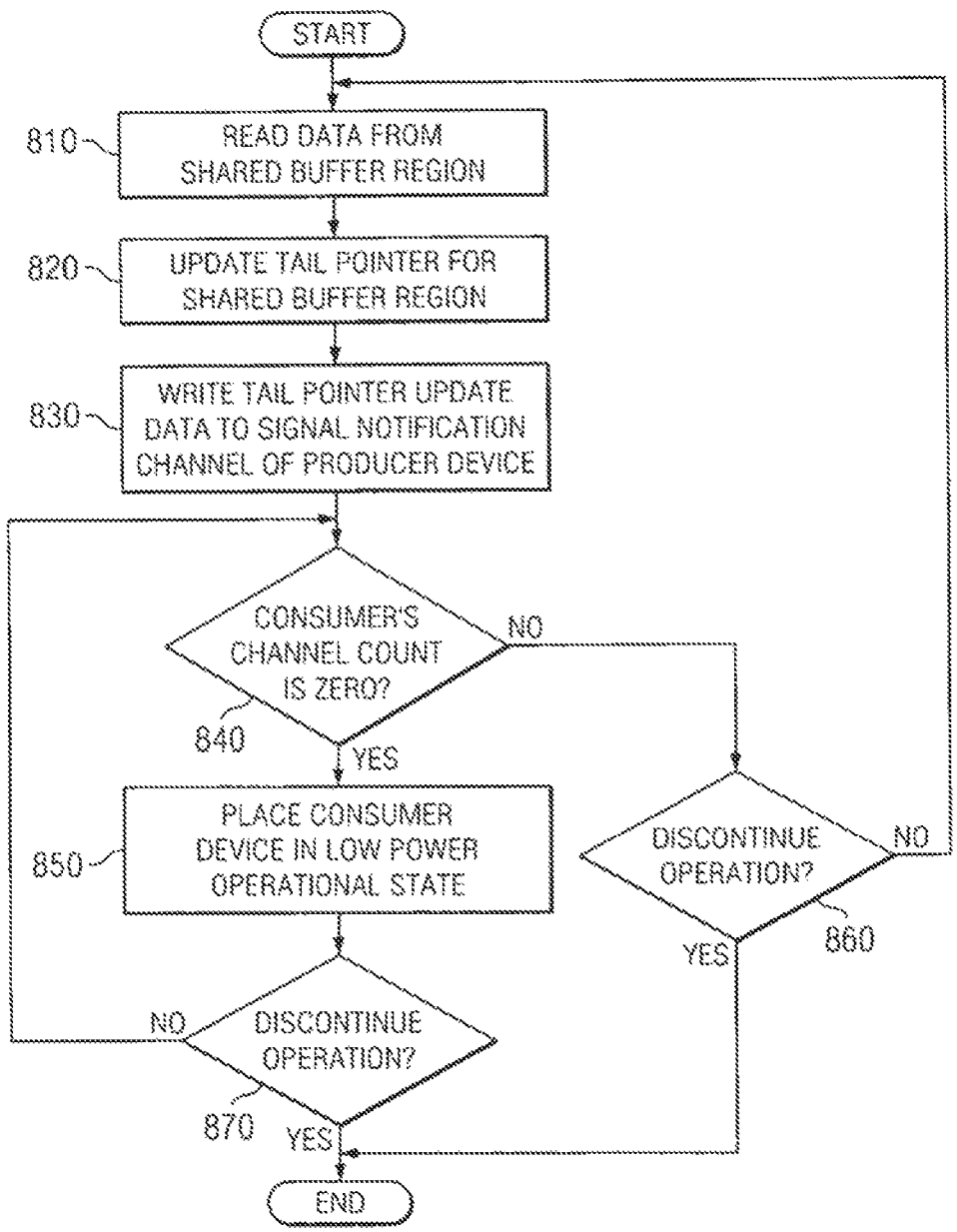

EFFICIENT COMMUNICATION OF PRODUCER/CONSUMER BUFFER STATUS

BACKGROUND

1. Technical Field

The present application relates generally to an improved data processing system. More specifically, the present application is directed to an apparatus and method for efficient communication of producer/consumer buffer status.

2. Description of Related Art

In a data processing system, one processor or device typically acts as a producer by placing data into a shared buffer while another processor or device acts as a consumer by reading and processing the data placed there by the producer. For example, consider a data processing system where a producer and a consumer, independently operating on processors or devices within the data processing system, have access to a shared data buffer region. The shared data buffer region may be located, for example, in shared system or I/O memory and is commonly accessible by both parties. In addition to the shared buffer region, two state variables are shared between the producer and consumer: a head pointer (or index) and a tail pointer (or index), as shown in FIG. 1A.

FIG. 1A is an exemplary diagram of a shared buffer region in accordance with a prior art system. As shown in FIG. 1A, the shared buffer region 100 has an associated tail pointer 120 and head pointer 110. The head pointer 110 represents the next unused location in the shared buffer region 100. The tail pointer 120 represents the last unprocessed data location in the shared buffer region 100.

As a producer places data into the shared buffer region 100, the producer increments the head pointer 110. In this way, the producer indicates to consumers that new data is available for the consumers. Likewise, as the consumer retrieves data from the shared buffer region 100, the consumer increments the tail pointer 120, thereby indicating that data has been read from the shared buffer region 100. The amount of data available in the shared buffer region 100 is indicated by the difference between the head pointer 110 and tail pointer 120. This is referred to as the "active" data region 140 in the shared buffer region 100. The portion of the shared buffer region 100 that is behind the tail pointer 120 is referred to as the "inactive" (or old) data region 130. An empty shared buffer region is identified by setting the head pointer 110 and tail pointer 120 to the same location in the shared buffer region 100.

When there is no constraint on the size of the shared buffer region, i.e, when there is an infinite amount of storage space available for the shared buffer region 100, the head pointer 110 and tail pointer 120 may be incremented indefinitely. However, in most systems, it is more realistic to have only a fixed amount of storage space available for the shared buffer region 100. In this case, it is possible to reclaim the inactive region 130 by implementing what is known as a circular first-in-first-out (FIFO) type shared buffer region 100. This type of shared buffer region is illustrated in FIG. 1B.

As shown in FIG. 1B, the head pointer 110 and tail pointer 120 are incremented as described above with regard to FIG. 1A, however when the end of the shared buffer region 100 is encountered, the head and tail pointers 110 and 120 are permitted to wrap back to the beginning of the shared buffer region 100. As with the shared buffer region 100 shown in FIG. 1A, the active data region 140 is defined as the portion of the shared buffer region 100 between the head pointer 110 and tail pointer 120. However, with the FIFO shared buffer region, both the producer and consumer must now account for the situation where the head pointer 110 has wrapped beyond the end of the shared buffer region 100, i.e. back to the beginning of the shared buffer region 100, but the tail pointer 120 has not wrapped.

This requires efficient communication of the current values for the head and tail pointers 110 and 120 to both the producer and the consumer. The consumer is primarily concerned with monitoring updates to the head pointer 110 and the producer is primarily concerned with monitoring updates to the tail pointer 120. Before a consumer can begin processing, it must know that the head pointer 110 and tail pointer 120 point to different entries in the shared buffer region 100. Likewise, before the producer can add data to the shared buffer region 100, the producer must ensure that the amount of data to be added will not overflow the tail pointer 120.

A simple implementation may involve storing the state variables, i.e. the head pointer 110 and tail pointer 120, in shared system memory and monitoring these state variables remotely. FIG. 2A illustrates this exemplary implementation.

As shown in FIG. 2A a producer 250 performs updates to the head pointer 210 in shared memory 230 and monitors the current state of tail pointer 220 in shared memory 230 when writing data to the shared buffer region 240. Similarly, the consumer 260 updates the tail pointer 220 in shared memory 230 and monitors the current state of the head pointer 210 in shared memory 230 when reading data from the shared buffer region 240.

The producer 250 and consumer 260 each perform updates and monitoring of the head pointer 210 and tail pointer 220 in shared memory 230 remotely. That is, the head pointer 210 and tail pointer 220 are not located in a memory local to the producer 250 or the consumer 260. Thus, the producer 250 and consumer 260 must access these pointers 210 and 220 via a bus or other communication interface that is not local to the producer 250 or consumer 260. Typically, the producer 250 and consumer 260 poll the remote shared memory 230 in order to obtain information regarding the head and tail pointers 210 and 220. As a result, this updating and monitoring requires additional resources, e.g., processor cycles, bus bandwidth, etc., within the system to support these operations. Because of the need to utilized additional system resources, this solution may be considered too detrimental to overall system performance.

In an alternative approach, the head and tail pointers 210 and 220 are maintained in a memory or registers that are local to either the producer 250 or the consumer 260 in order to improve performance of that one party, i.e. the producer 250 or the consumer 260, to which the pointers 210 and 220 are made local. FIG. 2B illustrates such an alternative implementation in which the head pointer 210 and tail pointer 220 are stored in a local memory region 270 to one of the producer 250 and consumer 260 (in the depicted example, the local memory region 270 is local to the consumer 260).

As shown in FIG. 2B, the head pointer 210 and tail pointer 220 are stored in local memory region 270 that is local to consumer 260. This local memory region 270 is separate from shared memory 230 and shared buffer region 240. The producer 250 must remotely monitor, i.e. poll, the value of the tail pointer 220 in order to determine the amount of free space remaining in the shared buffer region 240. This may lead to serious degradation of performance for the producer, as the latency for reading remote locations can be several orders of magnitude worse than for main shared memory storage. Of course the situation could be reversed, requiring that the consumer 260 remotely monitor the head pointer 210 in a local memory region local to the producer 250, for example.

SUMMARY OF THE INVENTION

In view of the above, it would be beneficial to have an improved mechanism for efficient communication of shared buffer status between producers and consumers in a data processing system. The illustrative embodiments provide such an improved mechanism by utilising already existing communication channels established with processing elements of the data processing system to communicate this shared buffer status information.

With the illustrative embodiments, synergistic processor elements (SPEs) are provided in a data processing system. The SPEs are a simple, yet highly optimized, processor with a single instruction, multiple data (SIMD) instruction set. The SPEs have a large register file, a high speed local memory, and a channel interface that serves as the primary communication pathway between an SPE and external processors or devices.

The channel interface is a message passing interface that overlaps input/output (I/O) with data processing and minimizes power consumed by synchronization. The channel facilities of the channel interface are accessed with three types of instructions: a read channel instruction, write channel instruction, and read channel count instruction which measures channel capacity. These channels may be configured as blocking or non-blocking channels. Channels that are defined as blocking channels cause the SPE to stall when accessing a channel whose channel count is zero. In this sense, the channel count indicates the number of outstanding operations that can be issued for that channel without causing the SPE to stall. Aside from blocking on channel access, an SPE program can monitor a variety of channel events using SPE interrupt facilities.

The SPE channel interface supports two signal notification channels, which may be used by the SPE to receive signals originating from other processors or devices in the system. The signal notification channels can be programmed to operate in over-write mode. Over-write mode is a mode in which the latest notification messages written to the channel "over-write" previous notification messages written to the channel such that the processors may access the most recent information written to the signal notification channel. The over-write mode of the signal communication channels is useful in a one-to-one communications environment, or in a logical-OR communications environment, such as in a many-to-one signaling environment.

With the illustrative embodiments, the producer, running on an SPE, may read its signal notification channel(s) and operate in a blocking mode until the consumer updates the tail pointer information written to the signal notification channel(s). This provides a low-power, low-bandwidth alternative to monitoring, i.e. polling, a remote memory or register location that is local to the consumer. Further, this solution provides low latency responses for real-time systems since the SPE is automatically awoken as soon as data becomes available on the signal, notification channel(s).

In another illustrative embodiment, the producer running on the SPE may use the processor's event and interrupt facilities to receive asynchronous notification of consumer's completion. This solution may be of use in environments where there is other work to be done by the SPE and blocking on a channel is not an acceptable alternative.

Of course these illustrative embodiments may be extended by reversing the roles and having the SPE program act as a consumer, while an external processor or device acts as a producer. In such a case, the producer would notify the SPE of buffer state updates by writing the head pointer to a signal notification register. The embodiments may be further extended by having the SPE program operate as both a consumer (receiving head pointer updates from an external device or processor on a first signal notification channel, for example) and as a producer (receiving tail pointer updates from an external device or processor on a second signal notification channel, for example).

In one illustrative embodiment, a method is provided in which an operation on a shared buffer region is performed, using a first device in a data processing system. The method may further comprise writing a pointer update to a signal notification channel associated with a second device in the data processing system. The pointer update may be an update to one of a head pointer or a tail pointer of the shared buffer region. The method may further comprise updating a pointer stored in a local store of the second device based on the pointer update. The signal notification channel may be a memory mapped address region of a shared memory of the data processing system.

The operation on the shared buffer region may be a write operation for writing data to the shared buffer region. The pointer update may be an update to a head pointer of the shared buffer region.

Alternatively, the operation on the shared buffer region may be a read operation for reading data from the shared buffer region. The pointer update may be an update to a tail pointer of the shared buffer region.

The method may further comprise determining if the shared buffer region is full and placing the second device in a low-power consumption waiting state waiting for a predetermined amount of storage space to be freed in the shared buffer region before additional data may be written to the shared buffer region. Placing the second device in a low-power consumption waiting state may comprise placing the notification channel in a blocking mode of operation in which the second device's normal operation is blocked and the second device waits in a low-power consumption state.

The operation may be a read operation for reading data from the shared buffer region. The notification channel may exit the blocking mode of operation in response to the read operation.

While in the blocking mode of operation, a channel interface of the second device may periodically issue a read channel count instruction to the signal notification channel to determine a count associated with the notification channel. If the count associated with the notification channel is zero, then the notification channel may remain in a blocking mode of operation. If the count associated with the notification channel is non-zero, then the notification channel may exit the blocking mode of operation. In response to the notification channel exiting the blocking mode of operation, the second device may be awoken by issuing a read channel instruction to the notification channel and returning results of the read channel, instruction to the second device.

The second device may be a synergistic processing unit and the shared buffer region is part of the local store associated with the synergistic processing unit. Writing a pointer update may be performed using a channel interface of a memory flow control unit associated with the synergistic processing unit. Moreover, the first device and the second device may be synergistic processing units of a multiprocessor system-on-a-chip.

In another illustrative embodiment, a computer program product comprising a computer usable medium having a computer readable program is provided. The computer readable program, when executed on a computing device, may cause the computing device to perform, using a first device in the data processing system, an operation on a shared buffer region and write a pointer update to a signal notification channel associated with a second device in the data processing system. The pointer update may be an update to one of a head pointer or a tail pointer of the shared buffer region. The computer readable program may further cause the computing device to update a pointer stored in a local store of the second device based on the pointer update. Moreover, the computer readable program may further cause the computing device to perform the various operations outlined above with regard to the method illustrative embodiment.

In yet another illustrative embodiment, a system is provided that comprises a first processor, a second processor coupled to the first processor, and a local storage device coupled to the second processor. The first processor may perform an operation on a shared buffer region of the local storage device and may write a pointer update to a signal notification channel associated with the second processor. The pointer update may be an update to one of a head pointer or a tail pointer of the shared buffer region. The second processor may update a pointer stored in the local store of the second processor based on the pointer update.

The operation on the shared buffer region may be a write operation for writing data to the shared buffer region. The pointer update may be an update to a head pointer of the shared buffer region.

Alternatively, the operation on the shared buffer region may be a read operation for reading data from the shared buffer region. The pointer update may be an update to a tail pointer of the shared buffer region.

The second processor may determine if the shared buffer region is full and may place itself in a low-power consumption waiting state waiting for a predetermined amount of storage space to be freed in the shared buffer region before additional data may be written to the shared buffer region. The second processor may place itself in a low-power consumption waiting state by placing the notification channel in a blocking mode of operation in which the second processor's normal operation is blocked and the second processor waits in a low-power consumption state.

The operation may be a read operation for reading data from the shared buffer region. The notification channel may exit the blocking mode of operation in response to the read operation. While in the blocking mode of operation, a channel interface of the second processor may periodically issue a read channel count instruction to the signal notification channel to determine a count associated with the notification channel. If the count associated with the notification channel is non-zero, then the notification channel may exit the blocking mode of operation.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention, are set forth in the appended claims. The invention itself, however, as well as a preferred mode of use, further objectives and advantages thereof, will best be understood by reference to the following detailed description of an illustrative embodiment when read in conjunction with the accompanying drawings, wherein;

FIG. 3 is an exemplary block diagram of a data processing system in which aspects of the illustrative embodiments may be implemented;

FIG. 7 is a flowchart outlining an exemplary operation of an illustrative embodiment in which a process running on a SPE operates as a producer; and FIG. 8 is a flowchart outlining an exemplary operation of an illustrative embodiment in which a process running on a SPE operates as a consumer.

DETAILED DESCRIPTION OF THE PREFERRED EMBODIMENTS

Figure 1A:
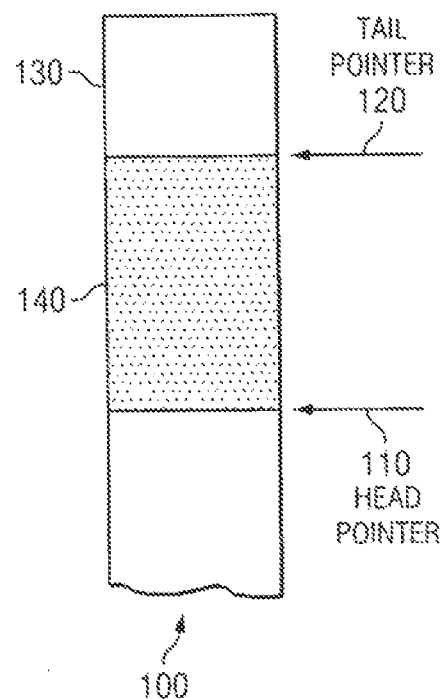
FIG. 1A is an exemplary diagram of a shared buffer region in accordance with a known mechanism.
Figure 1B:
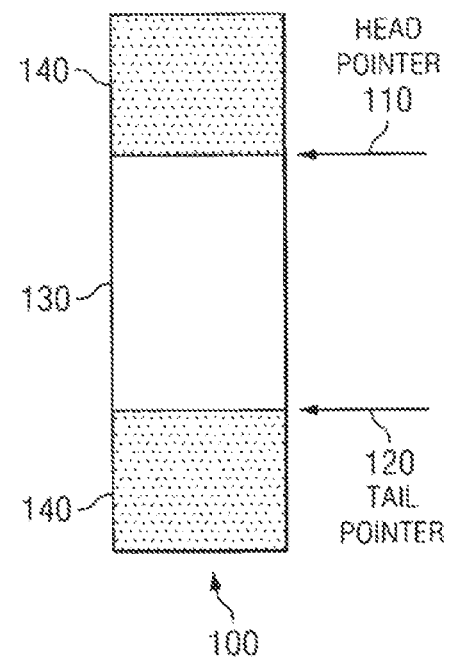
FIG. 1B is an exemplary diagram of a FIFO shared buffer region in accordance with a known mechanism.

The following is intended to provide a detailed description of illustrative embodiments and should not be taken to be limiting of the invention itself. Rather, any number of variations may fall within the scope of the invention defined in the claims following the description.

FIG. 3 is an exemplary block diagram of a data processing system in which aspects of the present invention may be implemented. The exemplary data processing system shown in FIG. 3 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 3, the CBE 300 includes a power processor element (PPE) 310 having a processor (PPU) 316 and its L1 and L2 caches 312 and 314, and multiple synergistic processor elements (SPEs) 320-334 that each has its own synergistic processor unit (SPU) 340-354, memory flow control 355-362, local memory or store (LS) 363-370, and bus interface unit (BIU unit) 380-394 which may be, for example, a combination direct memory access (DMA), memory management unit (MMU), and bus interface unit. A high bandwidth internal element interconnect bus (EIB) 396, a bus interface controller (BIC) 397, and a memory interface controller (MIC) 398 are also provided.

The CBE 300 may be a system-on-a-chip such that each of the elements depicted in FIG. 3 may be provided on a single microprocessor chip. Moreover, the CBE 300 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 320-334 are coupled to each other and to the L2 cache 314 via the EIB 396. In addition, the SPEs 320-334 are coupled to MIC 398 and BIC 397 via the EIB 196. The MIC 398 provides a communication interface to shared memory 399. The BIC 397 provides a communication interface between the CBE 300 and other external buses and devices.

The PPE 310 is a dual threaded PPE 310. The combination of this dual threaded PPE 310 and the eight SPEs 320-334 makes the CSS 300 capable of handling 10 simultaneous threads and over 128 outstanding memory requests. The PPE 310 acts as a controller for the other eight SPEs 320-334 which handle most of the computational workload. The PPE 310 may be used to run conventional operating systems while the SPEs 320-334 perform vectorized floating point code execution, for example.

The SPEs 320-334 comprise a synergistic processing unit (SPU) 340-354, memory flow control units 355-362, local memory or store 363-370, and an interface unit 380-394. The local memory or store 3S3-370, in one exemplary embodiment, comprises a 256 KB instruction and data memory which is visible to the PPE 310 and can be addressed directly by software.

The PPE 310 may load the SPEs 320-334 with small programs or threads, chaining the SPEs together to handle each step in a complex operation. For example, a set-top box incorporating the CSE 300 may load programs for reading a DVD, video and audio decoding, and display, and the data would be passed off from SPE to SPE until it finally ended up on the output display. At 4 GHz, each SPE 320-334 gives a theoretical 32 GFLOPS of performance with the PPE 310 having a similar level of performance.

The memory flow control units (MFCs) 3SS-3S2 serve as an interface for an SPU to the rest of the system and other elements. The MFCs 355-362 provide the primary mechanism for data transfer, protection, and synchronisation between main storage and the local storages 363-370. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

The HFC units 355-362 provide a channel interface and channel interface facilities through which the SPEs 320-334 may communicate with other SPEs, the PPE 310, and other devices coupled to the EIB 396. The channel interface is a message passing interface that overlaps I/O with data processing and minimises power consumed by synchronization. The channel facilities of the channel interface provide a read channel and a write channel and may be accessed by a read channel instruction, a write channel instruction, and read channel count instruction which measures channel capacity. These channels may be configured as blocking or non-blocking channels. Channels that are defined as blocking channels cause the corresponding SPE 320-334 to stall when accessing a channel whose channel count is zero. In this sense, the channel count indicates the number of outstanding operations that can be issued for that channel without causing the SPE 320-334 to stall. Aside from blocking on channel access, the channel facilities may monitor a variety of channel events using channel interface event and interrupt facilities.

The SPE's channel interface supports two signal notification channels, which may be used by the SPE 320-334 to receive signals originating from other processors, e.g., other SPE's, or devices in the system, which will be collectively referred to as external devices. The signal notification channels can be programmed to operate in over-write mode. Overwrite mode is a mode in which the latest notification messages written to the channel "overwrite" previous notification messages written to the channel such that the processors of the SPEs 320-334 may access the most recent information written to the signal notification channel. The over-write mode of the signal communication channels is useful in a one-to-one communications environment, or in a logical-OR communications environment, such as in a many-to-one signaling environment.

The channels themselves are essentially memory mapped address regions of shared memory 399. That is, when a channel is establish, an address region of the shared memory 399 is allocated for use in storing the data that is to be passed on the channel between the SPE and the external device, e.g., another SPE or other type of device in the system. Thus, when a channel is "written to" this means that the data is written to the memory mapped address region of shared memory 399 allocated for that channel, i.e. a register in the shared memory 399. Similarly, when a channel is "read," this means that the data stored in the memory mapped address region of the shared memory 399 allocated to the channel is read. When the channel is in "overwrite" mode, this means that the data in the mapped address region for the channel is overwritten with new data when new data is written to the channel.

The channel interface facilities include facilities for monitoring the memory mapped address region of the shared memory 399 that is allocated to the channels being maintained by the channel interface. When new data is made available in the memory mapped address region, the channel interface facilities may "wake up" the processor of the SPE by generating an appropriate "wake up" message that is sent to the processor. In this way, the process may remain in a low power state until a "wake up" message is received. This mechanism is referred to as a blocking mode channel operation. Alternatively, the availability of new data in the memory mapped address region may cause the channel interface facilities to generate an event or interrupt that is received and processed by an event or interrupt handler running on the processor of the corresponding SPE.

More information regarding the Cell Broadband Engine may be found at the IBM DeveloperWorks website. Specifically, the Cell Broadband Engine architecture document "Cell Broadband Engine Architecture V1.0" is available at wwww-128.ibm.com/developerworks/power/cell/, which is hereby incorporated by reference.

Using the broadband engine described in FIG. 3 as the basis for a data processing system in which an illustrative embodiment may be implemented, it can be seen that a shared buffer region may reside, for example, in the shared memory 399 accessible via the memory interface controller 398, or in a local store 363-370 associated with a SPE 320-334. This shared buffer region may be used to pass data between SPEs 320-334 so as to perform complex processing. Thus, it is necessary for the SPEs 320-334 that share the shared buffer region to be able to access information regarding the head and tail pointers for the shared buffer region.

Figure 2A:
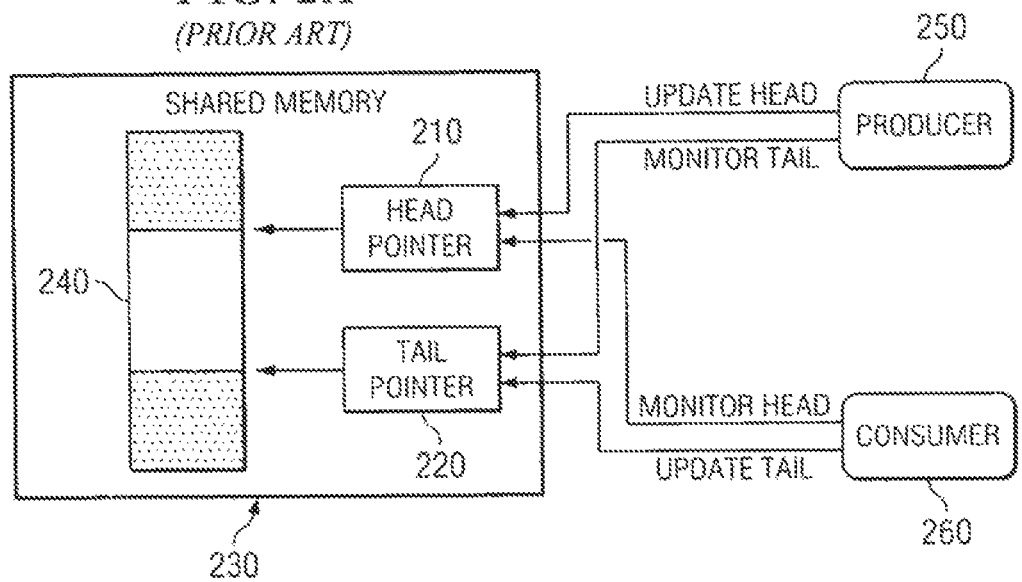
FIG. 2A is an exemplary diagram illustrating a mechanism for storing head and tail pointers in a shared memory in accordance with a known mechanism.
Figure 2B:
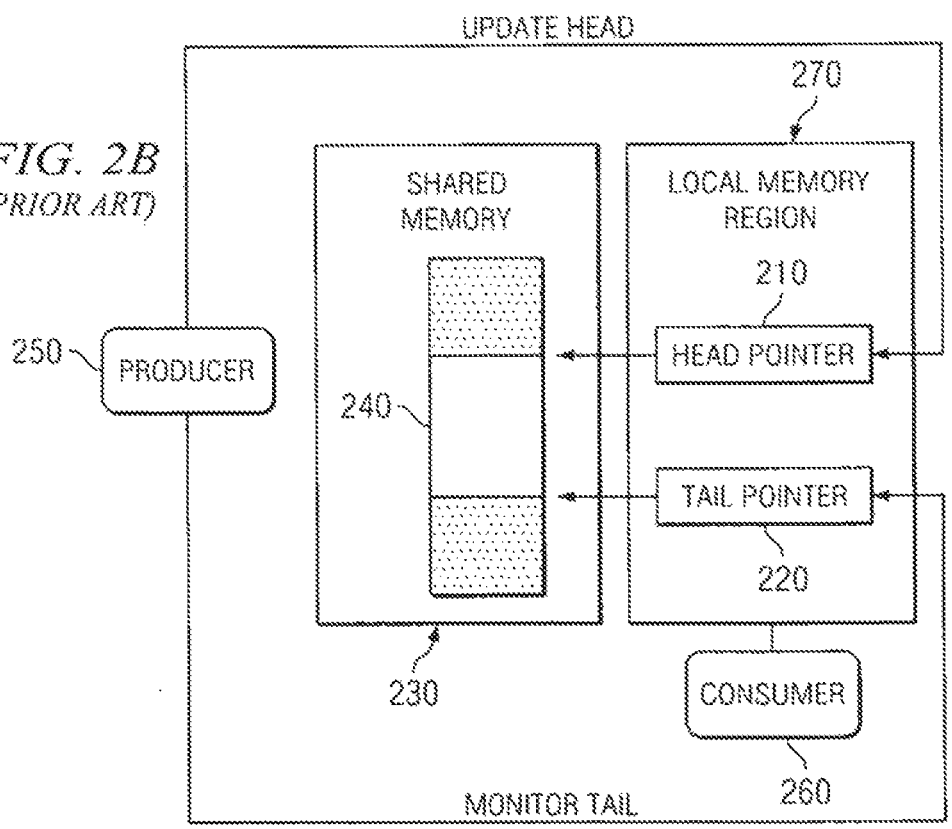
FIG. 2B is an exemplary diagram illustrating an alternative implementation in which the head pointer and tail pointer are stored in a local memory region that is local to a consumer in accordance with a known mechanism.

As mentioned above, one mechanism for maintaining the head and tail pointers for a shared buffer region is to have the head and tail pointers stored in a local storage that is local to one of the consumer or the producer (see FIG. 2B). Thus, in one exemplary embodiment of the present invention, the head and tail pointers are stored in a local memory 363-370 associated with an SPE 320-334. For example, in an operation involving two SPEs, e.g., SPE 320 and SPE 330, one of the SPEs, e.g., SPE 320, may run a program or thread that operates as a consumer of data produced by a program or thread running on the other SPE, e.g., SPE 330. The head and tail pointers for the shared buffer region that stores this data may be stored in the local memory 363 associated with the SPE 320, which is acting as a consumer, for example (although it could easily as well be stored in the local memory 368 associated with SPE 330). The SPE 320 would update the tail pointer as that SPE 320 reads and processes data from the shared buffer region. The SPE 330 would update the head pointer as that SPE 330 generates data and writes that data to the shared buffer region.

The SPEs 320 and 330 communicate the current status of the head and tail pointers for the shared buffer region via signal notification channels provided by the MFC units 355-362. With the illustrative embodiment, the producer, running on SPE 330, may read its signal notification channel(s) and may operate in a blocking mode until the consumer, running on SPE 320, updates the tail pointer information written to the signal notification channel(s). The blocking mode may be used so as to ensure that overflows of the shared buffer region are not encountered. That is, as long as the shared buffer region is not full, the producer may continue writing data and updating the head pointer even though the tail pointer is not modified. However when the producer detects that the shared buffer region is full (or may become full by writing some number of bytes to it), such as by looking at the head and tail pointer values, then the producer needs to wait for the desired amount of free space to become available in the shared buffer region. With the illustrative embodiments, this "waiting" may be facilitated by the producer blocking the SPE's operation by reading the signal notification channel and waiting in a low-power state for the consumer to update the tail pointer.

In writing to a notification channel, the producer may use a write channel instruction that writes to a memory mapped address region, or register, associated with the channel of the consumer. The producer may read data from the channel by using a read channel instruction that is directed to a memory mapped address region, or register, associated with the producer's signal notification channel. Similarly, the consumer may use a write channel instruction to write to the memory mapped address region, or register, associated with the producer's signal notification channel and a read channel instruction to read from a memory mapped address region, or register, associated with the consumer's signal notification channel.

The signal notification channels of the producer and/or consumer may operate in a blocking mode by using the read channel count instruction. The channel interface of the SPE may periodically issue the read channel count instruction to the appropriate memory mapped address regions, or registers, associated with the channels to thereby determine if there is any data to be retrieved from those memory mapped address regions. If the count is zero, then the channel interface of the SPE leaves the processor of the producer/consumer SPE in a low power state, i.e. a "sleep" state. If the count is other than zero, then the channel interface may "wake up" the processor of the producer/consumer SPE by issuing a read channel instruction to the memory mapped address region for the channel and returning the results of the read channel instruction to the processor of the SPE.

The "low power state" or "sleep" state is managed entirely by hardware. The hardware takes advantage of the blocked state of a SPE channel by reducing power consumption, and ramps the power back up when an external processor or device writes data to the SPE channel. Programs implemented on traditional CPUs implement a "high power" busy-poll alternative. While a SPU program may likewise busy-poll by issuing "read channel count" instructions until data is available (channel count>0), such busy-poll loops burn power and require more code than a simple "read channel" instruction as used with the illustrative embodiments.

This mechanism of using the signal notification channel(s) provides a low-power, low-bandwidth alternative to monitoring, i.e. polling, a remote memory or register location that is local to the consumer/producer. Further, this solution provides low latency responses for real-time systems since the SPEs 320 and 330 are automatically awoken as soon as data becomes available on the signal notification channel(s).

In another illustrative embodiment, the producer, running on the SPE 330, may use the channel interface's event and interrupt facilities to receive asynchronous notification of the consumer's completion of processing of data from the shared buffer region. That is, for example, the consumer may generate an interrupt or event when the consumer completes reading and processing of a portion of data from the shared buffer region. This event or interrupt may be directed to the event or interrupt facilities of the processor 350 associated with the producer's SPE 330.

Each SPE is capable of receiving notification on a set of external events. An SPE program can mask or unmask a set of events, and then monitor event status (such as by reading channel 0 or polling its channel count) or can choose to branch to an asynchronous interrupt handler when an event is received. SPEs can enable or disable interrupts by executing the IRETE/IRETD instructions. If asynchronous interrupts are enabled and an unmasked event occurs (e.g. data present in a signal notification channel), then the SPE hardware (a) disables interrupts, (b) saves the current program counter, and (c) branches to interrupt dispatch code, which is fixed at local store offset 0. The program's interrupt handler may then read the external event status and proceed to handle the event. The CBEA document incorporated above discusses these operations further under the "SPU Event Facility" section of the document.

As mentioned above, the event and interrupt facilities may include an event or interrupt handler which performs special processing of the event or interrupt. Such event or interrupt handlers are generally known in the art and thus, a detailed explanation of event/interrupt handlers is not provided herein. However, SPU interrupts allow user-mode programs to directly access interrupt facilities. Many CPUs expose this function only to supervisor/OS code, which typically requires several layers of system calls to access. By having access to interrupt facilities, SPU applications programmers are able to improve the real-time response of their programs, and can use programming techniques that would not normally be available to them. This solution may be of use in environments where there is other work to be done by the SPE and blocking on a channel is not acceptable.

Of course these embodiments may be extended by reversing the roles and having the SPE 330 act as a consumer, while the SPE 320 or other device external to the consumer acts as a producer. In such a case, the producer would notify the SPE 330 of buffer state updates by writing the head pointer to a signal notification channel of the SPE 330. The embodiments may be further extended by having the programs or threads running on the SPEs 320 and 330 operate as both a consumer (receiving head pointer updates from an external device or processor on a first signal notification channel, for example) and as a producer (receiving tail pointer updates from an external device or processor on a second signal notification channel, for example).

Figure 4:
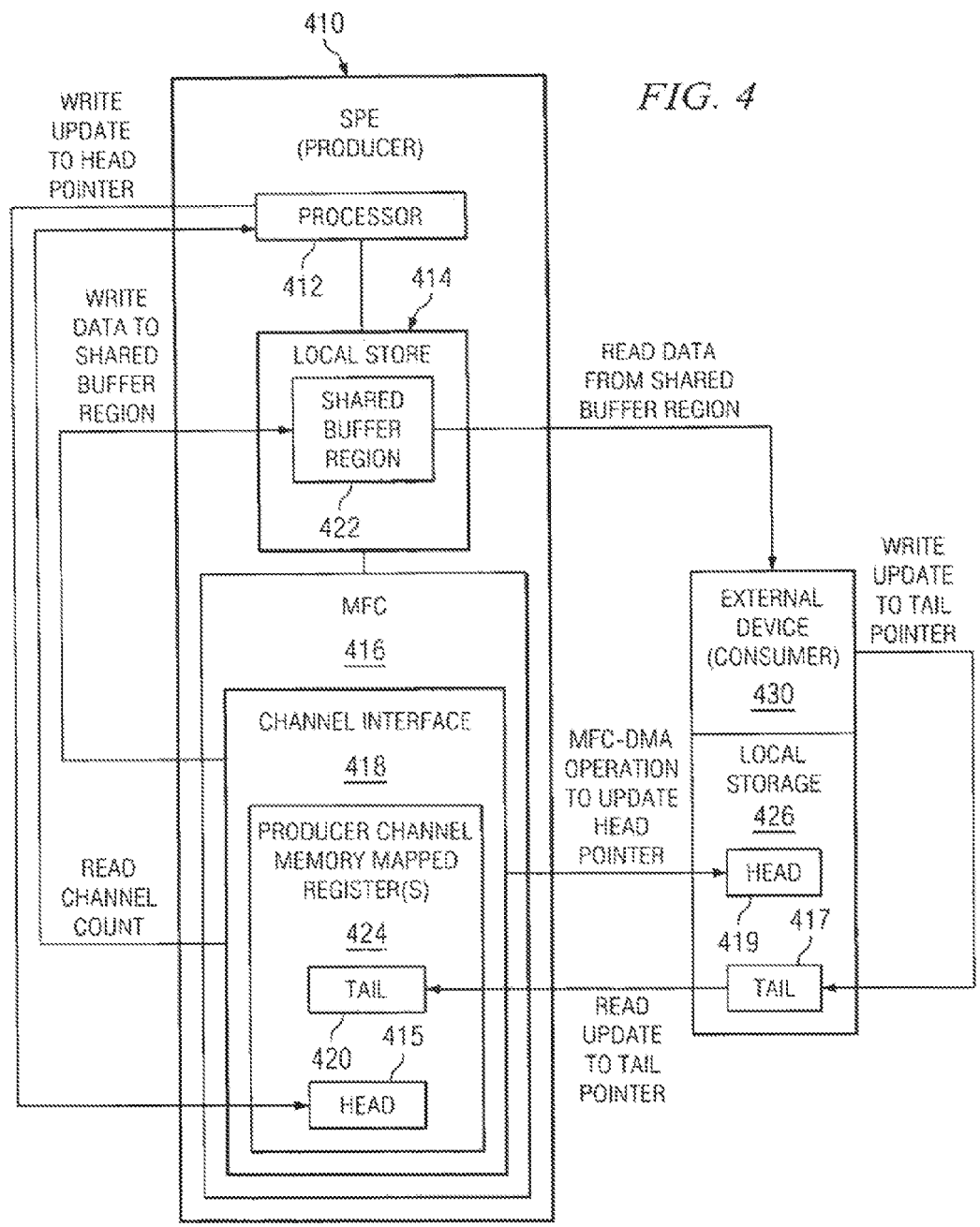
FIG. 4 is an exemplary block diagram illustrating an interaction between a producer and a consumer with regard to updating state information for a shared buffer region in accordance with one illustrative embodiment where a process running on a SPE operates as a producer.

FIG. 4 is an exemplary block diagram illustrating an interaction between a producer and a consumer with regard to updating state information for a shared buffer region in accordance with one exemplary embodiment of the present invention where a process running on a SPE operates as a producer. As shown, in FIG. 4, a SPE 410, operating as a producer of data to the shared buffer region 422 of the local store 414, includes a processor 412, the local store 414, and a memory flow control unit (MFC) 416. The MFC unit 416 includes a channel interface 418 and its associated channel interface facilities. The channel interface 418 further includes producer channel memory mapped register(s) 424 which store, among other things, a current state of the head pointer 415 and tail pointer 420 of the shared buffer region 422.

In writing data to the shared buffer region 422, the SPE 410 also updates the head pointer 415 for the shared buffer region 422 and informs the consumer, external device 430, of these updates by performing a memory flow control direct memory access (MFC-DMA) "put" request to a memory mapped register or portion of a local storage 426, e.g., the head pointer register 419, associated with the consumer device 430.

The external device 430, which is any device that is "external" to the SPE 410 including other SPEs or devices coupled to the system bus, reads data from the shared buffer region 422 and, in response to the reading of data, updates a tail pointer 417 of the shared buffer region 422 in the local storage 426 of the external device 430. If the external device is another SPE, the tail pointer 417 may be written to a channel interface of the consumer SPE. In order to update the tail pointer 420 on the producer SPE 410, the external device 430 writes tail pointer update data to the tail pointer 417 in the consumer local storage 426 and performs a channel write operation to the producer channel memory mapped register(s) 424 indicating an update to the tail pointer.

In response to performing the channel write operation, the channel count for the producer channel memory mapped register(s) 424 is incremented. Each SPU channel is configured for the purpose of either read or write. Each SPU channel has a capacity, or channel count, which indicates the number of outstanding read or write operations that may be performed against that channel. Further, each channel can be configured as either blocking or non-blocking. A blocking channel will stall the SPU when there is no remaining capacity (e.g. the channel count is 0), while operations targeting a non-blocking channel always return immediately (in other words these channels always have a channel count of at least 1). The signal notification channels are configured as blocking. When there is data available in the signal notification channels, the count is 1 and reads are returned immediately. When there is no data present, the count is zero, and the reads will block the SPU until data becomes available.

The channel interface 418 of the producer SPE 410 periodically sends a read channel count instruction to the producer channel memory mapped register(s) 424 which determines the current count of the producer channel memory mapped register(s) 424. If this count is zero, the processor 412 is placed in a low power "sleep" state. If this count is other than zero, then the channel interface 418 sends a read channel instruction to read the tail pointer update data from the tail pointer register 417 in the consumer's local storage 426. The tail pointer update data may be used to update the tail pointer register 420 in the producer channel memory mapped register(s) 424. It should be noted that by using the read channel count instruction of the channel interface 418, the processor 412 may be kept in a low power "sleep" state until the consumer, i.e. external device 430, updates the tail pointer register 417 indicating that it has read data from the shared buffer region 422 and thus, additional data may be written to the shared buffer region 422.

A copy (not shown) of the updated tail pointer 420 may be stored in the local store 414 of the producer SPE 410. The producer SPE 410 may reference this copy as long as there is sufficient space available in the shared buffer region 422. The producer SPE 410 may only update its local copy of the tail pointer 417 in the local store 414 when it detects that there is not sufficient space available in the shared buffer region 422.

Pseudo-code for waiting for space to become available may be implemented on the SPU as follows:

```
void wait_space(int nbytes)
{
    while (space( ) < nbytes)
        tail = spu_readch(3);
}
```

This example uses signal notification 1 (CH3) to receive tail pointer updates from the consumer. This code will block on the channel read when no data is available in that channel. However if there is already data present in the channel, then the "read channel" instruction, will return immediately. Thus, the producer only blocks when (a) there is not sufficient space available in the shared buffer region and (b) the consumer has not already updated the tail pointer.

It should be noted that there is no requirement that the external device 430 be another SPE or have channel interface facilities such as channel interface 418. The consumer may be any kind of processor or device that may consume data written to shared buffer region 422. From the producer SPE's perspective, all of the devices, whether SPEs or not, are treated the same. The producer SPE 410 issues an MFC-DMA "put" command to write the head pointer 415 to the external memory or register location associated with the external device 430. From the SPE producer's point of view, the particulars of how the consumer waits for head pointer updates (and whether it blocks, polls, etc.) do not matter to the operation of the producer.

Figure 5:
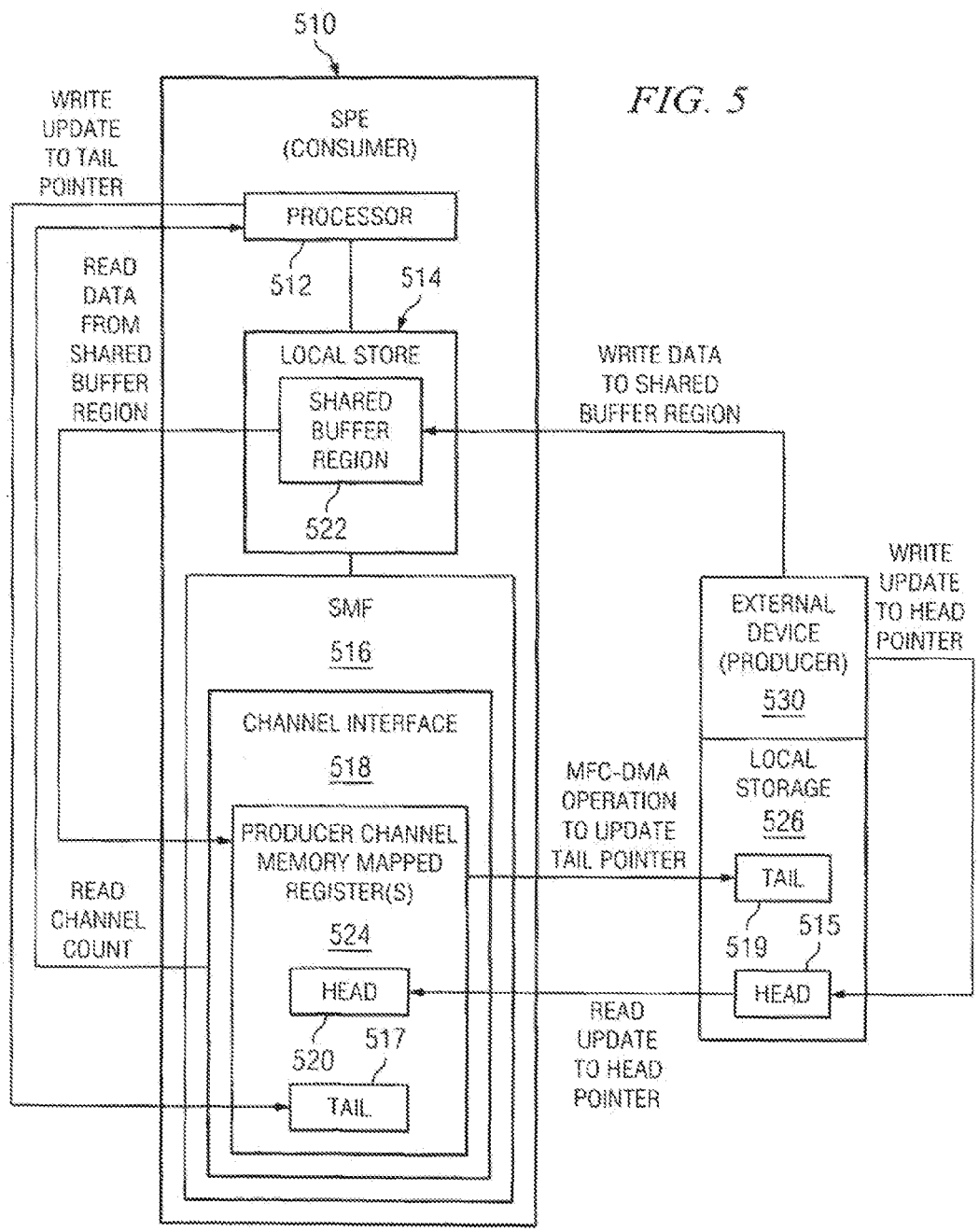
FIG. 5 is an exemplary block diagram illustrating an interaction between a producer and a consumer with regard to updating state information for a shared buffer region in accordance with one illustrative embodiment where a process running on a SPE operates as a consumer.

Similar mechanisms may be employed when the SPE operates as a consumer and the external device operates as a producer of data to the shared buffer region. FIG. 5 is an exemplary block diagram illustrating an interaction between a producer and a consumer with regard to updating state information for a shared buffer region in accordance with one illustrative embodiment where a process running on a SPE operates as a consumer. As shown in FIG. 5, external device 530 writes data to the shared buffer region 522 via the channel interface 518 and, in so doing, also updates the head pointer 515 for the shared buffer region 522 in its local storage 526. In order to update the head pointer 520 on the consumer SPE 510, the external device 530 writes the head pointer update data to the head pointer register 515 of local storage 526 and performs a write channel operation to the head pointer register 520 of the consumer channel memory mapped register(s) 524 indicating the update to the head pointer 515.

The channel interface 518 of the SPE 510, operating as a consumer, periodically sends a read channel count instruction to the consumer channel memory mapped register(s) 524 to determine the count for the head pointer channel. If the count is zero, the processor 512 is maintained in a low power "sleep" state. If the count is other than zero, then the channel interface 518 sends a read channel instruction to the consumer channel memory mapped register(s) 524 to thereby obtain the head pointer update data from the local storage 526 of the external device 530. This in turn causes the processor 512 to read data from the shared duffer region 522 and update the tail pointer 517 by writing the tail pointer update data to consumer channel memory mapped register(s) 524. The external device 530 may be informed of the update to the tail pointer 517 by way of an MFC-DMA "put" command in a similar manner as previously described above with regard to the update to the head pointer in FIG. 4.

The external device 530 receives the notification of the update to the tail pointer 517, may update its local copy of the tail pointer 519, and may write data to the shared buffer region 522 based on the updated tail pointer. If the external device 530 is another SPE having similar channel interface facilities and local store, a similar operation as described above in FIG. 4 may be followed by external device 530 to thereby update a local copy of the head and tail pointers and perform write operations to the shared buffer region 522.

Figure 6:
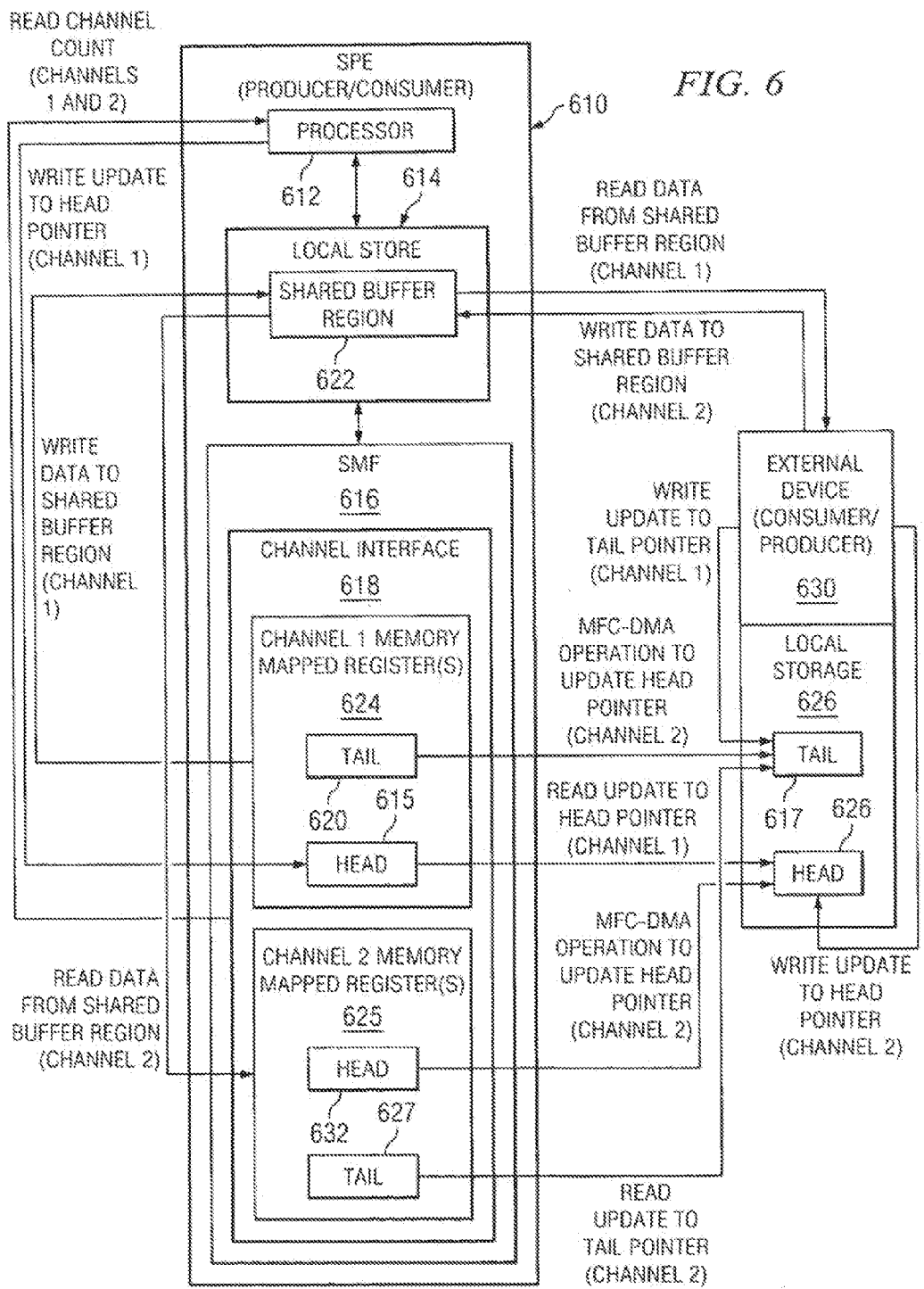
FIG. 6 is an exemplary block diagram illustrating an interaction between a producer and a consumer with regard to updating state information for a shared buffer region in accordance with one illustrative embodiment where a process running on a SPE operates as both a producer and a consumer.

FIG. 6 is an exemplary block diagram illustrating an interaction between a producer and a consumer with regard to updating state information for a shared buffer region in accordance with one exemplary embodiment of the present invention where a process running on a SPE operates as both a producer and a consumer. As shown in FIG. 6, the primary difference between this embodiment and the previous embodiments described in FIGS. 4 and 5 is that there are separate channels allocated to the SPE 410 that are provided for updates to the head pointer and the tail pointer. That is, a first channel, e.g., SPE channel 1 memory mapped register(s) 624, is provided to which the SPE 610 writes updates to the head pointer and a second channel, e.g., SPS channel 2 memory mapped register(s) 625, is provided to which the SPE 610 writes updates to the tail pointer. Thus, the first channel is used when the SPE 610 is operating in a producer role and the second channel is used when the SPE 610 is operating in a consumer role.

Since the SPE 610 may operate as both producer and consumer, the SPE 610 may read and write data to the shared buffer region 622. When the SPE 610 writes data to the shared buffer region 622 as a producer, the channel interface 618 writes head pointer update data to the head pointer register 615 in the channel 1 memory mapped address region 624 and may notify the external device 630 of the update by way of a MFC-DMA "put" instruction, for example. When the SPE 610 reads data from the shared buffer region 622 as a consumer, the SPE 610 may write tail pointer update data to the tail pointer register 627 in the channel 2 memory mapped address region 627. Similarly, the update to the tail pointer may be notified to the external device 630 by way of a MFC-DMA "put" instruction to the tail pointer storage location 617, for example.

The external device 630 may update the head pointer 626 and tail pointer 617 in local storage 626 based on operations performed by the external device 630 to either store or read data from the shared buffer region 622. The external device 630 may notify the SPE 610 of updates to the head and tail pointers using write channel instructions to respective ones of channel 1 and channel 2 memory mapped register(s) 624 and 625.

When the SPE 610 receives an update to the tail pointer 620 via the SPE channel 1 memory mapped address region 624, the SPE 610 may update a copy of the tail pointer in local store 614. When the SPE 610 receives an update to the head pointer 632 via the SPE channel 2 memory mapped address region 625, the SPE 610 may update a local copy of the head pointer in local store 614. The receipt of such updates may cause the processor 612 to exit a low power "sleep" state if the processor 612 were in such a "sleep" state in a similar manner as described above. Thus, the SPE 610 may write head and tail pointer updates to the signal notification channels and receive updates to head and tail pointers via these signal notification channels. Since the broadband engine architecture allows for two signal notification channels for each SPE or external device, the SPEs or external devices may use these signal notification channels in the manner described above to facilitate notification of head and tail pointer updates for a shared buffer region.

FIG. 7 is a flowchart outlining an exemplary operation of the present invention in which a process running on a SPE operates as a producer. It will be understood that each block, and combination of blocks, of the flowchart illustration in FIG. 7, and the flowchart illustrations in subsequent figures described hereafter, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 7, the operation starts by receiving data from the processor of the producer for writing to the shared buffer region (step 705). The received data is written to the shared buffer region (step 710). A head pointer for the shared buffer region is then updated (step 720). The head pointer update data is written to a signal notification channel of a consumer device (step 730). A determination is then made as to whether the current count on the producer's signal notification channel is zero (step 740). If so, the producer is placed in a low power operational mode or "sleep" state (step 750).

If the producer is not to be placed in a low power operation mode, a determination is then made as to whether the operation should be discontinued (step 760). This may involve tearing down the channel between the producer and the consumer, or other events that cause the producer/consumer relationship to be discontinued. If not, the operation returns to step 705 and the operation is repeated. If the producer is placed in a low power operation mode, a determination is made as to whether the operation should be discontinued (step 770). If not, the operation returns to step 740. If the operation is to be discontinued from either of step 760 or step 770, the operation terminates.

FIG. 8 is a flowchart outlining an exemplary operation of the present invention in which a process running on a SPE operates as a consumer. As shown in FIG. 8, the operation starts by reading data from the shared buffer region (step 810). A tail pointer for the shared buffer region is then updated (step 820). The tail pointer update data is written to a signal notification channel of a producer device (step 830). A determination is then made as to whether the current count on the consumer's signal notification channel is zero (step 840). If so, the consumer is placed in a low power operational mode or "sleep" state (step 850).

If the consumer is not to be placed in a low power operation mode, a determination is then made as to whether the operation should be discontinued (step 860). This may involve tearing down the channel between the producer and the consumer, or other events that cause the producer/consumer relationship to be discontinued. If not, the operation returns to step 810 and the operation is repeated. If the consumer is placed in a low power operation mode, a determination is made as to whether the operation should be discontinued (step 870). If not, the operation returns to step 840. If the operation is to be discontinued from either of step 860 or step 870, the operation terminates.

It should be appreciated that the operations outlined in FIGS. 7 and 8 may also be used in conjunction in a single apparatus. For example, an SPE that operates as both a consumer and a producer may perform the above operations outlined in FIGS. 7 and 8 in substantially parallel so as to both produce data for writing to the shared buffer region and read data from the shared buffer region.

Thus, the present invention provides a mechanism for notifying devices, such as synergistic processing elements, of updates to head and tail pointers of a shared buffer region. The mechanism of the present invention avoids the overhead and bus congestion of polling head and tail pointers by providing mechanisms for writing updates to signal notification channels of the devices and using channel interface facilities of the devices to update the head and tail pointers. Moreover, the present invention allows a device to remain in a low power "sleep" state until an update to the head or tail pointer is received from an external device at which time the device is awoken so that it may perform processing to either produce data to or consume data from the shared buffer region. This greatly decreases the power consumption of the system as a whole.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, comprising:
performing, using a first device in the data processing system, an operation on a shared buffer region in the first device, wherein the first device is a first synergistic processing unit;
writing, by the first device, a pointer update to a first register in a memory flow controller in the first device, wherein the pointer update is an update to one of a head pointer or a tail pointer of the shared buffer region;
writing, by the first device, the pointer update to a signal notification channel between the memory flow controller and a storage area in a second device in the data processing system, wherein the second device is a second synergistic processing unit;
updating, by the second device, a pointer stored in a second register in the storage area of the second device with the pointer update in response to the pointer update being written to the signal notification channel by the first device
determining, by either the first device or the second device, whether the shared buffer region is full;
responsive to the first device determining that the shared buffer region is full, entering, by the first device, a low-power consumption waiting state waiting for a predetermined amount of storage space to be freed in the shared buffer region before additional data may be written to the shared buffer region; and
responsive to the second device determining that the shared buffer region is full, entering, by the second device, the low-power consumption waiting state waiting for the predetermined amount of storage space to be freed in the shared buffer region before the additional data may be written to the shared buffer region,
wherein entering the low-power consumption waiting state comprises placing the signal notification channel in a blocking mode of operation, wherein while in the blocking mode of operation, a channel interface of the first device or the second device periodically issues a read channel count instruction to the signal notification channel to determine a count associated with the notification channel, and wherein if the count associated with the signal notification channel is zero, then the signal notification channel remains in the blocking mode of operation.

2. The method of claim 1, wherein the operation on the shared buffer region is a write operation for writing data to the shared buffer region, and wherein the pointer update is an update to a head pointer of the shared buffer region.

3. The method of claim 1, wherein the operation on the shared buffer region is a read operation for reading data from the shared buffer region, and wherein the pointer update is an update to a tail pointer of the shared buffer region.

4. The method of claim 1, wherein the signal notification channel is a memory mapped address region of a shared memory of the data processing system.

5. The method of claim 1, wherein the operation is a read operation for reading data from the shared buffer region, and wherein the signal notification channel exits the blocking mode of operation in response to the read operation.

6. The method of claim 1, wherein if the count associated with the signal notification channel is non-zero, then the signal notification channel exits the blocking mode of operation.

7. A computer program product comprising a non-transitory computer readable storage medium having a computer readable program recorded thereon, wherein the computer readable program, when executed on a computing device, causes the computing device to:

perform, using a first device in the data processing system, an operation on a shared buffer region in the first device, wherein the first device is a first synergistic processing unit;

write a pointer update to a first register in a memory flow controller in the first device, wherein the pointer update is an update to one of a head pointer or a tail pointer of the shared buffer region;

write the pointer update to a signal notification channel between the memory flow controller and a storage area in a second device in the data processing system, wherein the second device is a second synergistic processing unit;

update, using a second device in the data processing system, a pointer stored in a second register in the storage area of the second device with the pointer update in response to the pointer update being written to the signal notification channel by the first device determine, using either the first device or the second device, whether the shared buffer region is full;

responsive to the first device determining that the shared buffer region is full, place the first device in a low-power consumption waiting state waiting for a predetermined amount of storage space to be freed in the shared buffer region before additional data may be written to the shared buffer region; and responsive to the second device determining that the shared buffer region is full, placing the second device in the low-power consumption waiting state waiting for the predetermined amount of storage space to be freed in the shared buffer region before the additional data may be written to the shared buffer region, wherein entering the low-power consumption waiting state comprises placing the signal notification channel in a blocking mode of operation, wherein while in the blocking mode of operation, a channel interface of the first device or the second device periodically issues a read channel count instruction to the signal notification channel to determine a count associated with the notification channel, and wherein if the count associated with the signal notification channel is zero, then the signal notification channel remains in the blocking mode of operation.

8. The computer program product of claim 7, wherein the operation on the shared buffer region is a write operation for writing data to the shared buffer region, and wherein the pointer update is an update to a head pointer of the shared buffer region.

9. The computer program product of claim 7, wherein the operation on the shared buffer region is a read operation for reading data from the shared buffer region, and wherein the pointer update is an update to a tail pointer of the shared buffer region.

10. The computer program product of claim 7, wherein the signal notification channel is a memory mapped address region of a shared memory of the data processing system.

11. The computer program product of claim 7, wherein the operation is a read operation for reading data from the shared buffer region, and wherein the signal notification channel exits the blocking mode of operation in response to the read operation.

12. The computer program product of claim 7, wherein if the count associated with the signal notification channel is non-zero, then the signal notification channel exits the blocking mode of operation.

13. A system, comprising:
a first device;
a second device, wherein the first device is coupled to the second device; and
a memory device in the first device, wherein the first device performs an operation on a shared buffer region in the memory device, wherein the first device is a first synergistic processing unit, writes a pointer update to a first register in a memory flow controller in the first device, wherein the pointer update is an update to one of a head pointer or a tail pointer of the shared buffer region, and writes the pointer update to a signal notification channel between the memory flow controller and a storage area of the second device, wherein the second device is a second synergistic processing unit, wherein the second device updates a pointer stored in a second register in the storage area of the second device with the pointer update in response to the pointer update being written to the signal notification channel by the first device, wherein either the first device or the second device determines whether the shared buffer region is full, wherein, responsive to the first device determining that the shared buffer region is full, the first device places itself in a low-power consumption waiting state waiting for a predetermined amount of storage space to be freed in the shared buffer region before additional data may be written to the shared buffer region, wherein, responsive to the second device determining that the shared buffer region is full, the second device places itself in the low-power consumption waiting state waiting for the predetermined amount of storage space to be freed in the shared buffer region before the additional data may be written to the shared buffer region, wherein entering the low-power consumption waiting state comprises placing the signal notification channel in a blocking mode of operation, wherein while in the blocking mode of operation, a channel interface of the first device or the second device periodically issues a read channel count instruction to the signal notification channel to determine a count associated with the notification channel, and wherein if the count associated with the signal notification channel is zero, then the signal notification channel remains in the blocking mode of operation.

14. The system of claim 13, wherein the operation on the shared buffer region is a write operation for writing data to the shared buffer region, and wherein the pointer update is an update to a head pointer of the shared buffer region.

15. The system of claim 13, wherein the operation on the shared buffer region is a read operation for reading data from the shared buffer region, and wherein the pointer update is an update to a tail pointer of the shared buffer region.

16. The system of claim 13, wherein the signal notification channel is a memory mapped address region of a shared memory of the data processing system.

17. The system of claim 13, wherein the operation is a read operation for reading data from the shared buffer region, and wherein the signal notification channel exits the blocking mode of operation in response to the read operation.

18. The system of claim 13, wherein if the count associated with the signal notification channel is non-zero, then the signal notification channel exits the blocking mode of operation.

* * * * *